United States Patent [19]

Onishi et al.

[11] Patent Number: 4,882,638
[45] Date of Patent: Nov. 21, 1989

[54] PCM RECORDING AND REPRODUCING APPARATUS HAVING COMMON DATA FRAME CONSTRUCTION FOR SIGNAL SOURCES OF VARYING QUANTIZATION BIT NUMBER

[75] Inventors: Ken Onishi; Kazuhiro Sugiyama, both of Nagaokakyo, Japan

[73] Assignee: Mitsubishi Denki Kabushiki Kaisha, Tokyo, Japan

[21] Appl. No.: 917,617

[22] Filed: Oct. 10, 1986

[30] Foreign Application Priority Data

Oct. 11, 1985 [JP] Japan .................................. 60-227187
Jan. 23, 1986 [JP] Japan .................................. 61-12877
Jan. 23, 1986 [JP] Japan .................................. 61-12878

[51] Int. Cl.$^4$ ............................ G11B 5/00; G11B 5/09
[52] U.S. Cl. ......................................... 360/32; 360/51
[58] Field of Search ............... 360/32, 51; 340/347 M; 371/39, 40

[56] References Cited

U.S. PATENT DOCUMENTS

| | | | |
|---|---|---|---|
| 4,590,522 | 5/1986 | Takemoto et al. | 360/32 |
| 4,617,599 | 10/1986 | Noguchi et al. | 360/32 |
| 4,622,598 | 11/1986 | Doi et al. | 371/40 |
| 4,646,170 | 2/1987 | Kobayashi et al. | 371/39 |
| 4,682,332 | 7/1987 | Okamoto et al. | 360/32 |

FOREIGN PATENT DOCUMENTS 0129224 12/1984 European Pat. Off. .
0137855 4/1985 European Pat. Off. .
0178589 4/1986 European Pat. Off. .
0191410 8/1986 European Pat. Off. .

OTHER PUBLICATIONS

Patent Abstracts of Japan, vol. 7, No. 238 (P-231) (1383) Oct. 22, 1983.

Primary Examiner—Alan Faber
Assistant Examiner—Surinder Sachar
Attorney, Agent, or Firm—Birch, Stewart, Kolasch and Birch

[57] ABSTRACT

A pulse code modulation (PCM) recording and reproducing apparatus for recording analog signals from N channels which are sampled at a predetermined sampling frequency and converted into samples of a variable number of bits each. The samples of PCM data are assembled into a frame consisting of a specific number of samples and the frames are assembled into a number of blocks of PCM data comprising a specific number of tracks. The number of bits per frame is set to a value equal to the least common multiple of all values of bit quantization numbers which the samples may have such that digital signal sources of varying bit quantization formats may be accommodated by the recording apparatus utilizing a simplified structure.

8 Claims, 21 Drawing Sheets

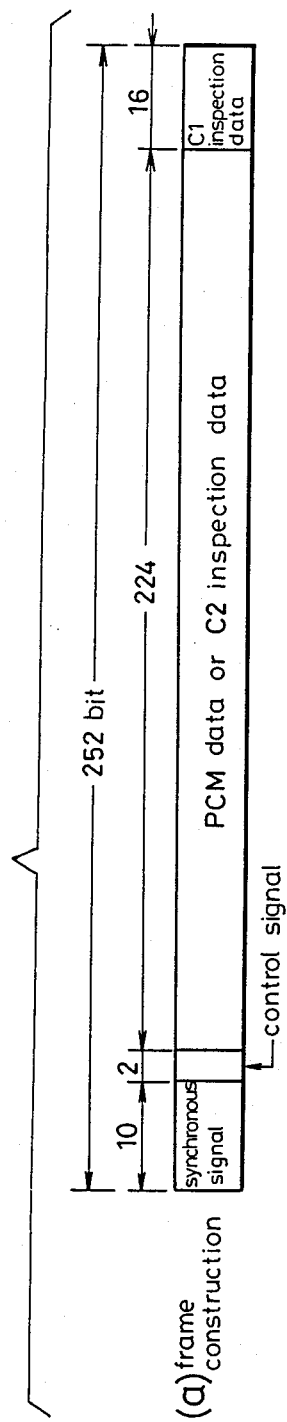
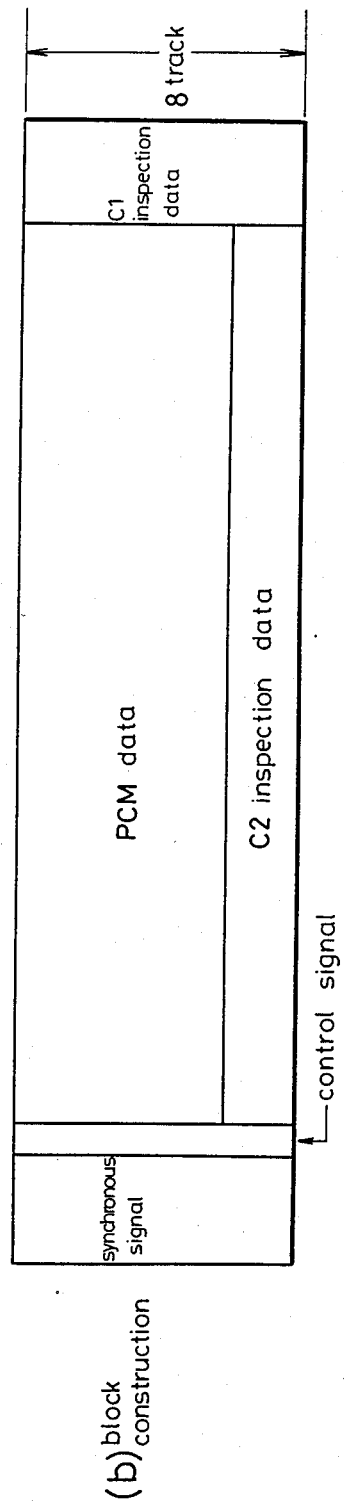
FIG. 1. (PRIOR ART)

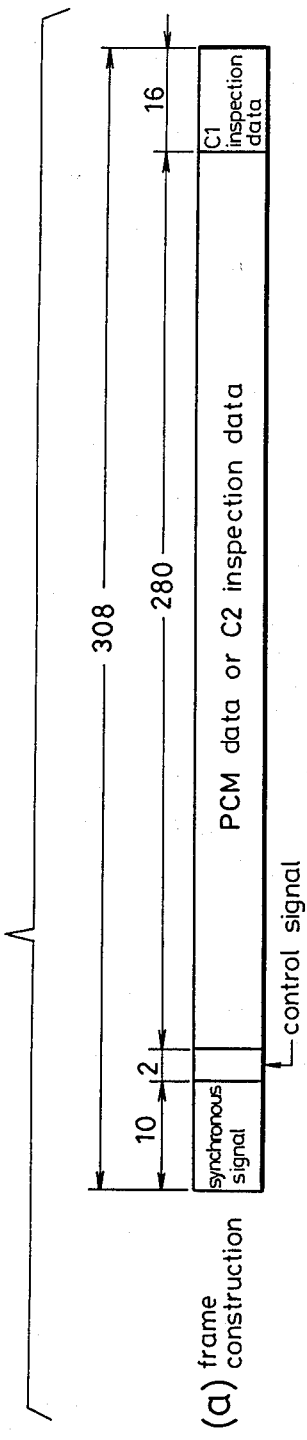
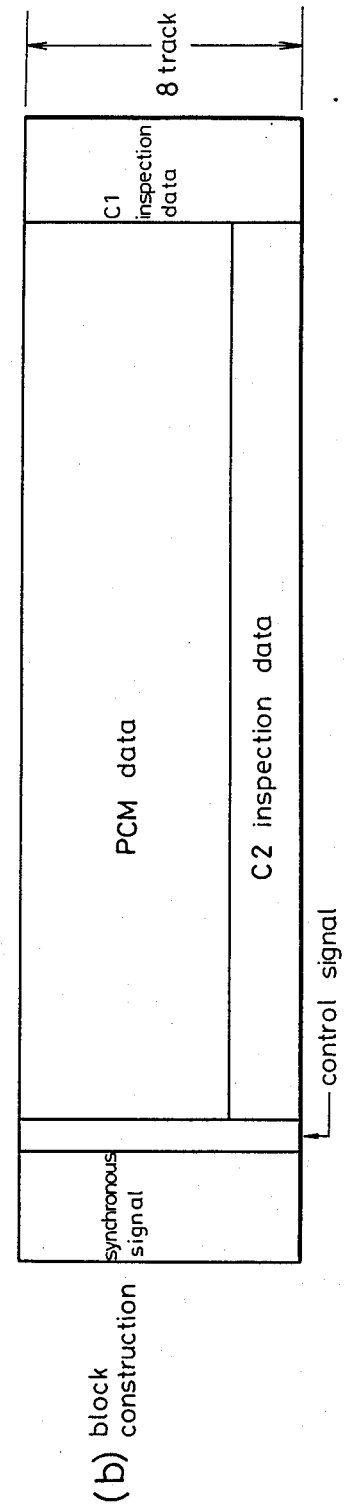
FIG. 4.

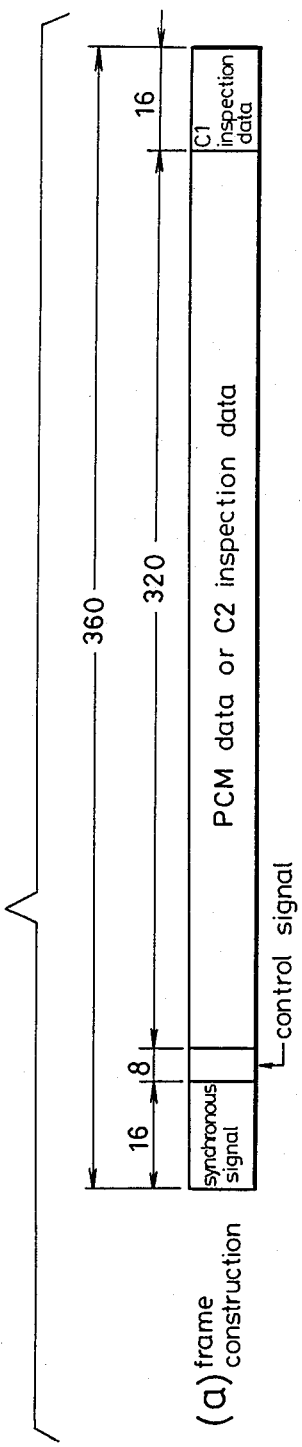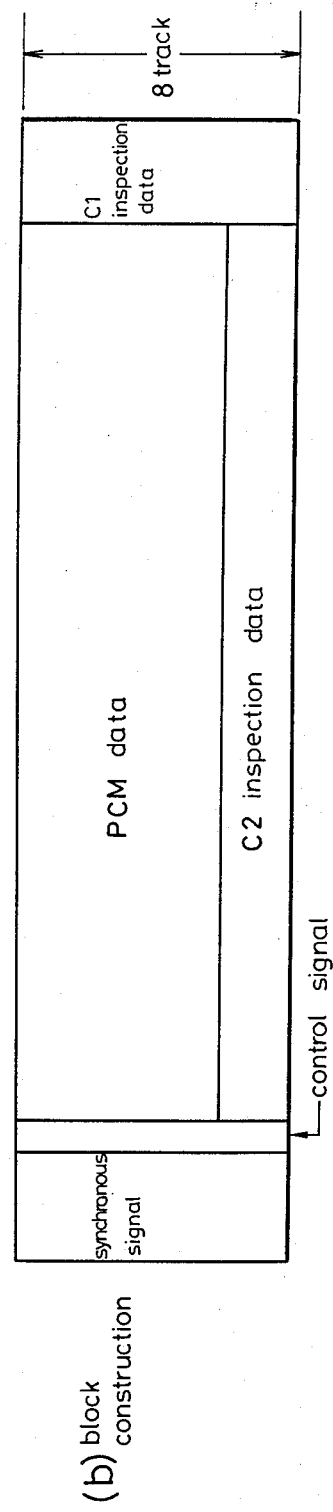

PCM RECORDING AND REPRODUCING APPARATUS HAVING COMMON DATA FRAME CONSTRUCTION FOR SIGNAL SOURCES OF VARYING QUANTIZATION BIT NUMBER

FIELD OF THE INVENTION

The present invention relates to a PCM (Pulse Code Modulation) recording and reproducing apparatus, and more particularly to that which gives a bit number appropriate to frame constructions for a plurality of kinds of quantization bit numbers.

BACKGROUND ART

There exists a PCM audio recorder as a device for recording and reproducing signals by conducting an A/D conversion by sampling analog signals at a sampling frequency Fs to obtain PCM data, constructing a frame by putting together a plurality of PCM data, and dividing (sharing) the same into a plurality of tracks. FIG. 1 shows a frame and a block construction of such a PCM recording apparatus, figure (a) shows a frame construction and figure (b) shows a block construction. One frame comprises 252 bits, and this comprises 14 samples of PCM data each quantized into 16 bits, 10 bits of a synchronous signal, 2 bits of a control signal, and 16 bits of C1 inspection data for error detection and correction. FIG. 1(b) shows a block construction in which frame constructed signals are recorded in a total of 8 tracks with 6 tracks for the PCM data and 2 tracks for the error detection correction data. The frame construction of FIG. 1 is determined in the following way.

Suppose that the number of channels of analog signals is N, the number of samples constituting one frame is S, and the number of tracks for recording the PCM data is Tr, the frame and block frequency $F_B$ is represented by the following formula.

$$F_B = \frac{F_S \times N}{S \times Tr} \quad (3)$$

Supposing that the number of bits in one frame is $T_S$, $T_S$ is represented by the following.

$$T_S = B \times S + m \quad (4)$$

Herein, B is a quantization bit number of a sample (number of bits per sample), and m is a number of additional bits such as of a synchronous signal. The transmission frequency Fc for transmitting the bits in the frame is represented by the following formula.

$$F_C = F_B \times T_S \quad (5)$$

Then, if the ratio of $F_C$ and $F_S \times N$ becomes a simple integer, $F_C$ and $F_S \times N$ can be generated from one clock, and the values of S and m are selected so as to enable the same. In the case of FIG. 1, N=2, S=14, Tr=6, and the block frequency $F_B$ becomes $$F_B = \frac{48 \times 2}{14 \times 6} = 1.143 \text{ kHz}$$

when the $F_S$ is 48 kHz. Because the synchronous signal comprises 10 bits, the control signal comprises 2 bits, and $C_1$ inspection data comprises 16 bits, the m=10+2+16=28. In addition, B=16, and thus $T_S$=16×14+28=252 bits from the formula (4). Accordingly, from the formula (5) $F_C$=252×1.143 kHz=288 kHz, and the ratio of $F_C$ and $F_S \times N$ becomes a simple integer, that is, 288:48×2=3:1. Such a clock can be generated by the clock generator of FIG. 2.

In FIG. 2, the reference numeral 1 designates a master clock oscillator, the reference numeral 2 designates a ÷6 frequency divider, the reference numeral 3 designates a ÷42 frequency divider, the reference numeral 4 designates a 252 counter, and the reference numerals 5, 6, 7, and 8 are output terminals. A signal of 288 kHz is generated by the ÷ master clock oscillator 1, and this signal is sent to the ÷ 6 frequency divider 2, the 252 counter 4, and the output terminal 6. The output of the ÷6 frequency divider 2 becomes 48 kHz, and this is sent to the ÷42 frequency divider 3 and the output terminal 8. The 252 counter 4 outputs clock signals required for such as the generation of the synchronous signal and the control signal to the output terminal 5. The ÷42 frequency divider 3 outputs clocks of block frequency $F_B$ to the output terminal 8.

FIG. 3 shows a block diagram of a PCM recording and reproducing apparatus which uses such a frame construction. In FIG. 3, the reference numeral 9 designates an input terminal for 2 channels of analog signals. The reference numeral 10 designates an A/D converter, the reference numeral 11 designates an encoder circuit, the reference numeral 12 designates a track sharing circuit, the reference numerals 13, 14, and 15 designate modulation circuits, the reference numerals 16, 17, and 18 designate recording amplifiers, the reference numerals 19, 20, and 21 designate recording heads, the reference numerals 22, 23, and 24 designate reproduction heads, the reference numerals 25, 26 and 27 designate reproduction amplifiers, the reference numerals 28, 29, and 30 designate demodulation circuits, the reference numerals 31, 32, and 33 designate time axis correction circuits (hereinafter referred to as "TBC circuit"), the reference numeral 34 designates a decoder circuit, the reference numeral 35 designates a D/A converter, the reference numeral 36 designates each channel analog output terminal, and the reference numeral 37 designates a clock generator.

The device operates as follows.

First of all, at the recording side, recording an analog signal input from the input terminal 9 is converted into PCM data having a quantization bit number B=16 by the A/D converter 10, and two error correction detection codes, that is, $C_2$ inspection data and $C_1$ inspection data are added thereto by the encoder circuit 11 so as to enable detecting and correcting errors due to limitations of the recording medium. A control signal is added to the encoded signal by the track sharing circuit 12, and the encoded signals split into 8 tracks to be sent to the modulation circuits 13, 14, and 15. These signals are modulated into signals appropriate for recording and reproducing on a recording medium by the modulation circuits 13, 14, and 15, a synchronous signal is added thereto, and this signal is recorded on a medium through the recording amplifiers 16, 17, and 18 and the recording heads 19, 20, and 21. At the reproduction side, the signals reproduced by the reproduction heads 22, 23, and 24 are amplified by the reproduction amplifiers 25, 26, and 27, the synchronous signals are detected and protected by the demodulation circuits 28, 29, and 30, the clocks are reproduced, and the clocks and the data from which the synchronous signals are separated are sent to the TBC circuits 31, 32, and 33. In the TBC circuits 31, 32, and 33 jitter and wow flutters are removed from the reproduced data, and the corrected data are sent to the decoder circuit 34. In the decoder circuit 34 error detection and correction of the data is conducted using the $C_1$ inspection data and the $C_2$ inspection data, the data is converted into the original analogue signal by the D/A converter 35, and it is output from the output terminal 36. Besides, the control signal is used for the control of the apparatus such as the control of the existence or non-existence of emphasis or the control of the frequency $F_S$. The clock generator 37 is fundamentally constituted as shown in FIG. 2. A clock of frequency $F_S$ is sent to the A/D converter 10 and the D/A converter 35, and clocks of frequency $F_C$ and $F_B$ and the output of the output terminal 5 are sent to the track sharing circuit 12, the modulation circuits 13, 14, and 15, and the TBC circuits 31, 32, and 33.

In such a recording and reproducing apparatus a frame/block construction of FIG. 4 is utilized in a case where a second quantization bit number $B_2=20$ is used. Because there is only a difference in the quantization bit number relative to FIG. 1, $T_S$ becomes $20\times14+28=308$ from the formula (4), and $F_C$ becomes 1.143 kHz$\times$308=352 WkHz from the formula (5). In this way, the bit number of one frame varies dependent on the quantization bit number such that 252 for a quantization bit numnber 16 and 308 for a quantization bit number 20. The main portion of a clock generator which corresponds to these two quantization bit numbers is shown in FIG. 5. In FIG. 5, the reference numeral 38 designates a master clock oscillator having a frequency of 3.168 MHz, the reference numeral 39 designates $\div11$ frequency divider, the reference numeral 40 designates a $\div66$ frequency divider, the reference numeral 41 designates a $\div9$ frequency divider, the reference numeral 42 designates a 252 counter, the reference numeral 43 designates a $\div42$ frequency divider, the reference numeral 44 designates a 308 counter, and the reference numerals 45, 46, 47, 48, 49, and 50 designate output terminals. When the quantization bit number is 16, the signals of the output terminals 45, 46, 47, and 48 are used as outputs, and when the quantization bit number is 20, the signals of the output terminals 47, 48, 49, and 50 are used as outputs.

The frame construction of the above-described PCM recording and reproducing apparatus has the following drawbacks.

First of all, as is apparent from FIGS. 2 and 5, the frequency of the master clock need become higher by eleven times as from 288 kHz to 3.168 MHz in order for the device to accommodate two quantization bit numbers, and this disadvantageously reduces the freedom of selection of clocks in a PCM recording and reproducing apparatus which uses various clocks for encoding. Further, the signals of the output terminals 45 to 50 are sent to the track sharing circuit 12 and the TBC circuits 31, 32, and 33, and if the bit number of one frame is changed, the control becomes complicated because these circuits usually use memories. Furthermore, when the bit number of one frame is changed the synchronous signal protection circuit in the decoder circuits 28, 29, and 30 does not operate, and the clocks to be sent to the TBC circuits 31, 32, and 33 must be switched for each track, thereby making the hardware complicated.

SUMMARY OF THE INVENTION

An object of the present invention is to provide an improved PCM recording and reproducing apparatus in which a frame bit number is the same with respect to more than two quantization bit numbers without making the master clock frequency higher, and which is capable of constituting using a track sharing circuit, modulation circuits, demodulation circuits, and TBC circuits of simple construction.

Another object of the present invention is to provide an improved PCM recording and reproducing apparatus which has a PCM data arrangement capable of increasing the cross fade period without lowering the burst error correction ability, and of having a constant memory capacity.

A further object of the present invention is to provide an improved PCM recording and reproducing apparatus capable of conducting encoding and decoding easily even in cases having different quantization bit numbers with the use of the same error correction encoder and decoder.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a PCM recording and reproducing apparatus in which N channels (N is an integer) of analog signals are analog-to-digital converted by a sampling frequency Fs to be converted into PCM data, several PCM data are put together to constitute a frame, and the PCM data are divided into Tr tracks (Tr is an integer), wherein ratio of the TA to TB is represented by a simple integer assuming that k quantization bit numbers are represented by Bi (i=1, ..., k), and the recording is conducted with making TA the same through all the quantization bit numbers as a bit nunber of one frame.

$$TA = n \times LCM(Bi(i=1, \ldots, k)) + m \quad (1)$$

$$TB = N \times S \times Tr \quad (2)$$

Herein, n: integer, m: an additional number of bits such as for a synchronous signal, LCM (Bi(i=1, ..., k): a least common multiple of the Bi(i=1, ... k), and S: the number of samples constituting a frame.

BRIEF DESCRIPTION OF THE DRAWINGS

FIG. 1, consisting of (a) and (b), is a diagram showing a frame/block construction in a case where the quantization bit number is 16 in a conventional PCM recording and reproducing apparatus;

FIG. 4, consisting of (a) and (b), is a diagram showing a frame/block construction in a case where the quantization bit number is 20 in a PCM recording and reproducing apparatus;

FIG. 6, consisting of (a) and (b), is a diagram showing a frame/block construction of the PCM recording and reproducing apparatus as a first embodiment of the present invention;

DETAILED DESCRIPTION OF THE PREFERRED EMBODIMENTS

Figure 2:
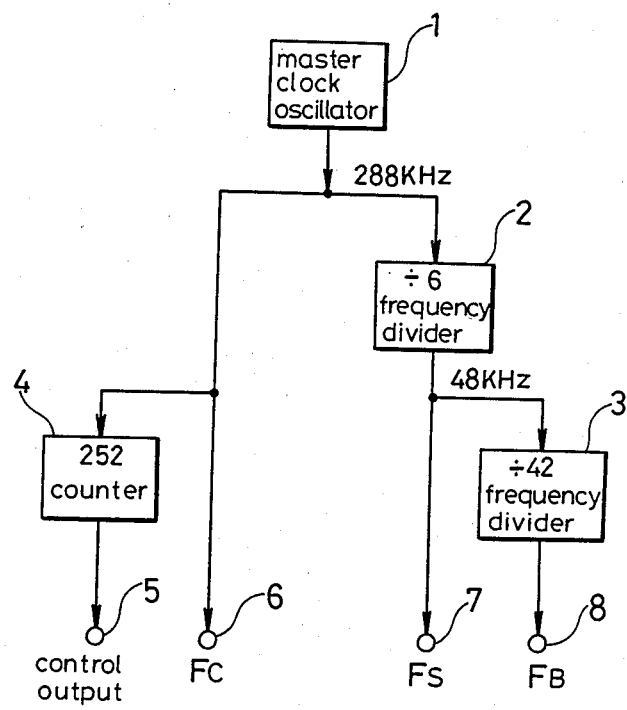
FIG. 2 is a block diagram showing a clock generator of the conventional device.

In order to explain the present invention in detail reference will be particularly made to FIG. 6.

FIG. 6(a) shows a frame construction and 6(b) shows a block construction of a PCM recording and reproducing apparatus as a first embodiment of the present invention. This frame construction comprises a total of 360 bits including 16 bits of a synchronous signal, 8 bits of a control signal, 320 bits of PCM data or $C_2$ inspection data, and 16 bits of $C_1$ inspection data. This frame construction is determined from the following.

If it is assumed that the channel number N=2, the sharing track number of PCM data Tr=6, and the two quantization bit numbers $B_1=16$, $B_2=20$, then the LCM (least common multiple) $(B_1, B_2)$ represented by the formula (1) becomes 80. The quotient of this LCM 80 by the one word bit number 16 is 5, but this is desired to be an even number in a case of two channels. Table 1 and Table 2 show the results obtained by calculating the formulae (1) and (2) using 80×2=160 bits instead of 80 and selecting the cases where the ratio of $T_A$ to $T_B$ is a simple integer. Table 1 shows a case where a quantization bit number $B_1=16$, and Table 2 shows a case where the quantization bit number $B_2=20$.

TABLE 1

| $T_A$ | n | m | N | S/2 | Tr | P | Q | $F_S$ | $F_C$ | $F_M$ |
|---|---|---|---|---|---|---|---|---|---|---|
| 186 | 1 | 26 | 2 | 5 | 6 | 31 | 10 | 48000 | 297600 | 2976000 |
| 190 | 1 | 30 | 2 | 5 | 6 | 19 | 6 | 48000 | 304000 | 1824000 |
| 192 | 1 | 32 | 2 | 5 | 6 | 16 | 5 | 48000 | 307200 | 1536000 |
| 198 | 1 | 38 | 2 | 5 | 6 | 33 | 10 | 48000 | 316800 | 3168000 |
| 200 | 1 | 40 | 2 | 5 | 6 | 10 | 3 | 48000 | 320000 | 960000 |
| 204 | 1 | 44 | 2 | 5 | 6 | 17 | 5 | 48000 | 326400 | 1632000 |
| 348 | 2 | 28 | 2 | 10 | 6 | 29 | 10 | 48000 | 278400 | 2784000 |
| 360 | 2 | 40 | 2 | 10 | 6 | 3 | 1 | 48000 | 288000 | 288000 |
| 504 | 3 | 24 | 2 | 15 | 6 | 14 | 5 | 48000 | 268800 | 1344000 |
| 510 | 3 | 30 | 2 | 15 | 6 | 17 | 6 | 48000 | 272000 | 1632000 |
| 520 | 3 | 40 | 2 | 15 | 6 | 26 | 9 | 48000 | 277333 | 2496000 |
| 522 | 3 | 42 | 2 | 15 | 6 | 29 | 10 | 48000 | 278400 | 2784000 |
| 672 | 4 | 32 | 2 | 20 | 6 | 14 | 5 | 48000 | 268800 | 1344000 |
| 680 | 4 | 40 | 2 | 20 | 6 | 17 | 6 | 48000 | 272000 | 1632000 |

TABLE 2

| $T_A$ | n | m | N | S/2 | Tr | P | Q | $F_S$ | $F_C$ | $F_M$ |
|---|---|---|---|---|---|---|---|---|---|---|
| 184 | 1 | 24 | 2 | 4 | 6 | 23 | 6 | 48000 | 368000 | 2208000 |
| 186 | 1 | 26 | 2 | 4 | 6 | 31 | 8 | 48000 | 372000 | 2976000 |
| 192 | 1 | 32 | 2 | 4 | 6 | 4 | 1 | 48000 | 384000 | 384000 |
| 198 | 1 | 38 | 2 | 4 | 6 | 33 | 8 | 48000 | 396000 | 3168000 |
| 200 | 1 | 40 | 2 | 4 | 6 | 25 | 6 | 48000 | 400000 | 2400000 |
| 204 | 1 | 44 | 2 | 4 | 6 | 17 | 4 | 48000 | 408000 | 1632000 |
| 208 | 1 | 48 | 2 | 4 | 6 | 13 | 3 | 48000 | 416000 | 1248000 |
| 348 | 2 | 28 | 2 | 8 | 6 | 29 | 8 | 48000 | 348000 | 2784000 |
| 352 | 2 | 32 | 2 | 8 | 6 | 11 | 3 | 48000 | 352000 | 1056000 |
| 360 | 2 | 40 | 2 | 8 | 6 | 15 | 4 | 48000 | 360000 | 1440000 |
| 368 | 2 | 48 | 2 | 8 | 6 | 23 | 6 | 48000 | 368000 | 2208000 |
| 504 | 3 | 24 | 2 | 12 | 6 | 7 | 2 | 48000 | 336000 | 672000 |
| 512 | 3 | 32 | 2 | 12 | 6 | 32 | 9 | 48000 | 341333 | 3072000 |
| 522 | 3 | 42 | 2 | 12 | 6 | 29 | 8 | 48000 | 348000 | 2784000 |
| 528 | 3 | 48 | 2 | 12 | 6 | 11 | 3 | 48000 | 352000 | 1056000 |
| 672 | 4 | 32 | 2 | 16 | 6 | 7 | 2 | 48000 | 336000 | 672000 |

Herein, P:Q represents the ratio of $T_A$ to $T_B$ and those having Q less than 10 are listed in these tables. $F_M$ is a master clock frequency. An even number from 24 to 48 bits is adopted as in because the system includes a synchronous signal, a control signal, and $C_1$ inspection data. The frame/block construction of FIG. 6 having $T_A=360$ bits is obtained by selecting a value of $T_A$ which is present in both of the Tables 1 and 2.

Figure 7:
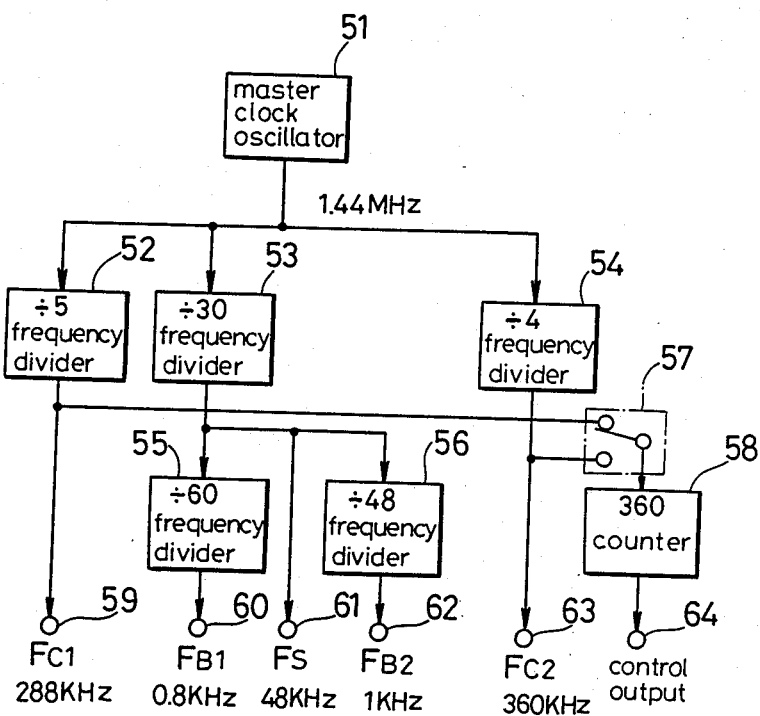
FIG. 7 is a block diagram showing a clock generator of the above-described embodiment.

The main portion of a clock generator realizing such a frame/block construction is shown in FIG. 7. In FIG. 7, the reference numeral 51 designates a master clock oscillator, the reference numeral 52 designates a ÷5 frequency divider, the reference numeral 53 designates a ÷30 frequency divider, the reference numeral 54 designates a ÷4 frequency divider, the reference numeral 55 designates a ÷60 frequency divider, the reference numeral designates a ÷48 frequency divider, the reference numeral 57 designates a switch, the reference numeral 58 designates a 360 counter, and the reference numerals 59 to 64 designate output terminals.

As is apparent from Tables 1 and 2, the master clock oscillator 51 generates a clock of 1.44 MHz, and this is sent to the ÷5 frequency divider 52, the ÷30 frequency divider 53, and the ÷4 frequency divider 54. The output of the ÷5 frequency divider 52 becomes a frequency $F_{CI}=288$ kHz which corresponds to the quantization bit number $B_1=16$, and this is sent to the output terminal 59. The output of the ÷4 frequency divider 54 becomes a frequency $F_{C2}=360$ kHz which corresponds to the quantization bit number $B_2=20$, and is sent to the output terminal 63. The output of the ÷30 frequency divider 53 becomes a frequency of $F_S=48$ kHz, and this is sent to the ÷60 frequency divider 55, the ÷48 frequency divider 56, and the output terminal 61. The output $F_{B1}=0.8$ kHz of the ÷60 frequency divider 55 and the output $F_{B2}=1$ KHz of the ÷48 frequency divider 56 are sent to the output terminals 60 and 62, respectively. The switch 57 outputs the output of the ÷5 frequency divider 52 when the quantization bit number $B_1=16$, and the output of the ÷4 frequency divider 54 when the quantization bit number $B_2=20$.

In this first embodiment the same number of bits per frame is used for more than two quantization bit numbers, thereby enabling the hardware of the recording and reproducing apparatus to be simplified and the frequency of the master clock to be lowered.

In the above-illustrated first embodiment the channel number $N=2$ and the track number $Tr=6$, but it is obvious that the frame bit number can be determined in accordance with the formulae (1) and (2) also in other cases having different channel numbers and different track numbers.

Furthermore, the illustrated embodiment has two quantization bit numbers ($B_1=16$, $B_2=20$), but it is obvious that the device may have more than two quantization bit numbers, and the formulae (1) and (2) are also effective in that case.

Furthermore, a multi-track recording and reproducing apparatus of $Tr=6$ is described in the illustrated embodiment, but the present invention is also applicable to a case where the recording and reproducing are conducted successively by one transmission line in the order of the track 1, track 2, ..., track 6, track 7, track 8, track 1, ....

In the above-described first embodiment, however, the A/D converted PCM data are not frame constituted in the order of appearance, but frame constituted by being interleaved so as to diversify burst errors which occur due to dropouts at the reproduction, and putting together the PCM data which is delayed for a predetermined time.

Figure 8:
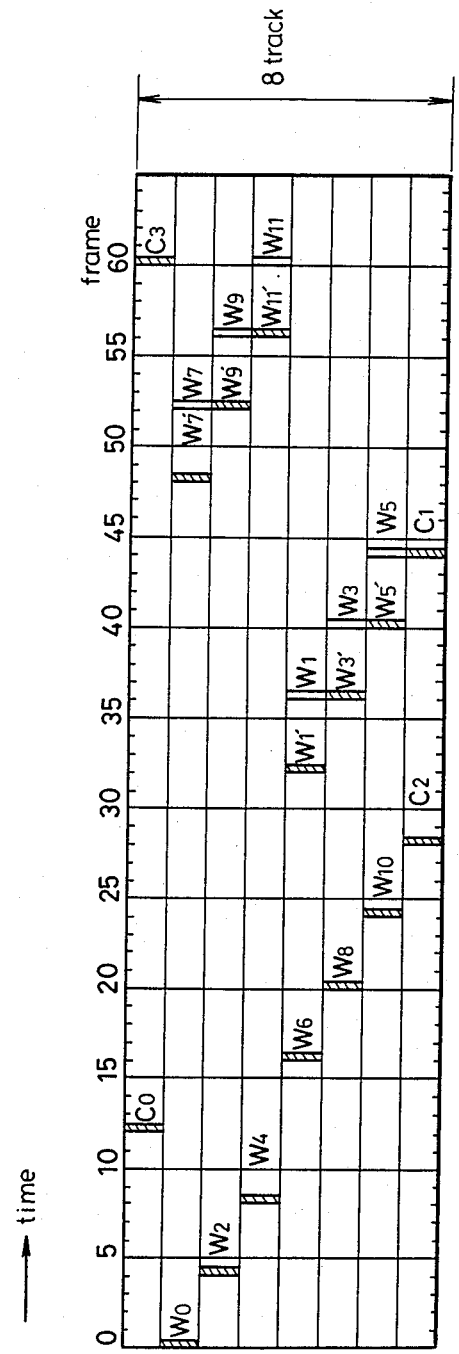
FIG. 8 is a diagram showing a data arrangement on the recording and reproducing material in the conventional device.

FIG. 8 shows the manner in which the PCM data are interleaved on the recording and reproducing material in a conventional device. The A/D converted PCM data are generated in the order of $W_0$, $W_1$, $W_2$, .... Herein, W designates one word of the PCM data sampled at one time, and this is data of 32 bit=2 channels×16 bits. Furthermore, the PCM data such as $W_1'$, $W_3'$, ..., $W_{11}'$ are delayed odd number PCM data which are delayed by a delay time $d_1$ relative to the odd number PCM data $W_1$, $W_3$, ..., $W_{11}$ among the PCM data $W_0$ to $W_{11}$. The $C_0$, $C_1$, $C_2$, and $C_3$ are $C_2$ inspection data generated for the even number PCM data and the delayed odd number PCM data $W_0$, $W_1'$, $W_2$, $W_3'$, ... among the above-described PCM data.

Figure 9:
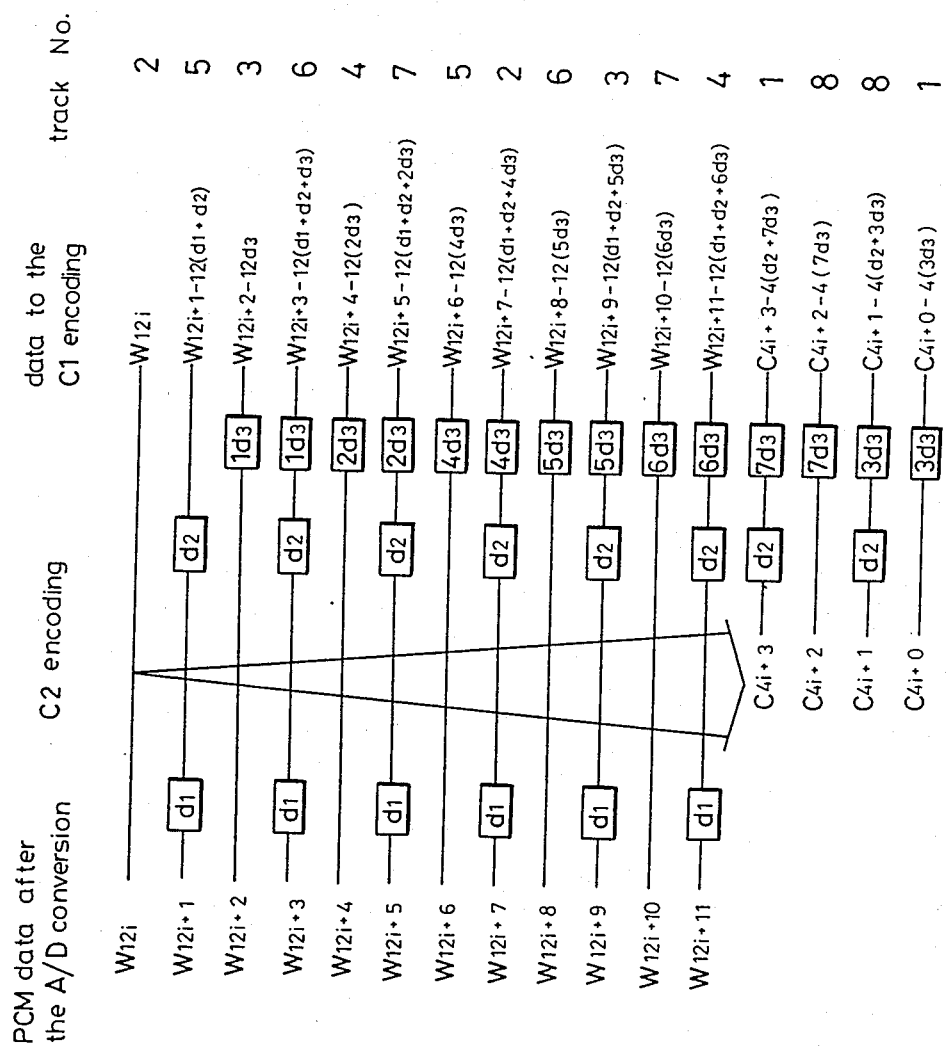
FIG. 9 is a diagram showing the concept of the encoding and data interleaving sequence of the conventional device.

FIG. 9 shows a data interleaving sequence for arranging the even number PCM data, the odd number PCM data, the delayed odd number PCM data, and the $C_2$ inspection data which are shown in FIG. 8. The interleaving operation will be described with reference to FIG. 9.

First of all, the A/D converted PCM data are separated into even number PCM data $W_{12i}$, $W_{12i+2}$, ... and odd number PCM data $W_{12i+1}$, and $W_{12i+3}$, ..., and the odd number PCM data is delayed by $d_1$. Next, $C_2$ encoding is conducted against the even number PCM data and the $d_1$ delayed odd number PCM data, thereby generating n=4 words of $C_2$ inspection data as $C_{4i+3}$, $C_{4i+2}$, $C_{4i+1}$, and $C_{4i+0}$. Subsequently, the delayed odd number PCM data and the 2 ($=n-n_1$) words of $C_2$ inspection data $C_{4i+3}$ and $C_{4i+1}$ are delayed by $d_2$, and furthermore delays of $d_3$ to $7d_3$ are given to each data as shown in FIG. 9. Herein, i of the $W_{12i+1}$ is an integer, and the pattern of data interleaving is repeated at every 12 data. Furthermore, in the example of FIG. 8, $d_1=20T$], $d_2=160[T]$, and $d_3=20[T]$, where the delay in one block is 5[T].

In this way, each data is arranged as shown in FIG. 8. That is, the even number PCM data and the odd number PCM data are arranged apart from each other, thereby enabling the conducting of a correction by using a mean value interleaving with the use of the previous and the following value even when a burst error arises. Furthermore, the odd number PCM data having different delays are providing so as to enable the preventing of abnormal sounds caused by correcting the even number PCM data by the inspection data for the odd number PCM data $W_1$, $W_3$, ... and the PCM data are successively corrected in such a case where the encoded data cannot be corrected by the $C_2$ inspection data and are judged to be perfectly errors.

Figure 10:
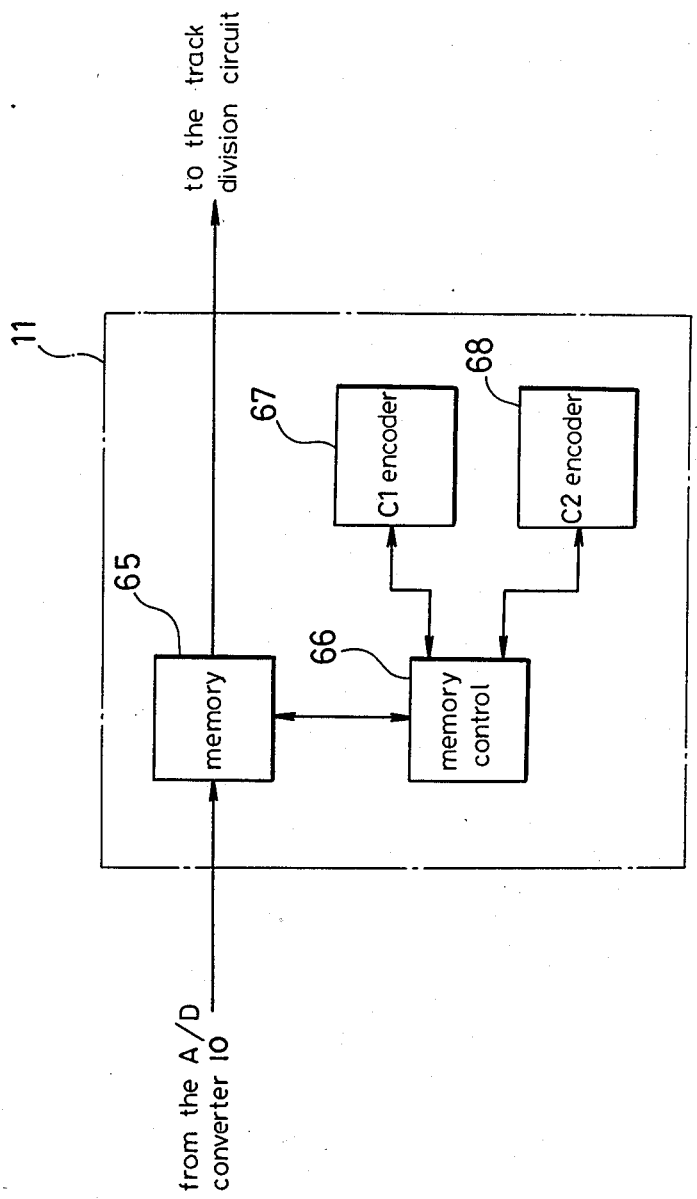
FIG. 10 is a block diagram showing an encoder circuit of a PCM recording and reproducing apparatus which conducts the recording and reproduction utilizing such a data arrangement.

FIG. 10 shows a block diagram of the encoder circuit 11 of a PCM recording and reproducing apparatus which conducts recording and reproduction utilizing such a data arrangement. The reference numeral 65 designates a memory, the reference numeral 66 designates a memory control circuit, the reference numeral 67 designates a $C_1$ encoder, and the reference numeral 68 designates a $C_2$ encoder. In order to simplify the memory control circuit 66, it is desirable that the capacity of the memory is divided into 61 block portions and that the PCM data from the A/D converter 10 are successively recorded at the positions of $W_0$, $W_1$, $W_2$, ... as shown in FIG. 8. In this system, the $C_2$ encoding is then conducted by taking out the PCM data in the order of $W_0$, $W_1'$, $W_2$, ... from the memory 65 thereby to conduct $C_2$ encoding, and the $C_2$ inspection data is stored in the memory 65. Thus, the $C_2$ encoded data is stored by more than one frame, and $C_1$ encoding is conducted by the $C_1$ encoder 67, thereby to generate $C_1$ inspection data. The encoded data in this way is sent to the track sharing circuit 12.

This conventional PCM recording and reproducing apparatus with such a construction has a property described below. As apparent from FIG. 8, the $C_2$ encoded data is diversified to 61 blocks at equal intervals at every 4 blocks, and the error correction ability when an error is generated at every block becomes that of 16 blocks because four errors can be corrected in a case where the error is detected by the $C_1$ code and corrected by the $C_2$ code, for example, in such a case where a Reed Solomon code on a Galois field ($2^8$) dealing with 8 bits as a unit (1 symbol) is used as the $C_2$ error correction code.

Figure 11:
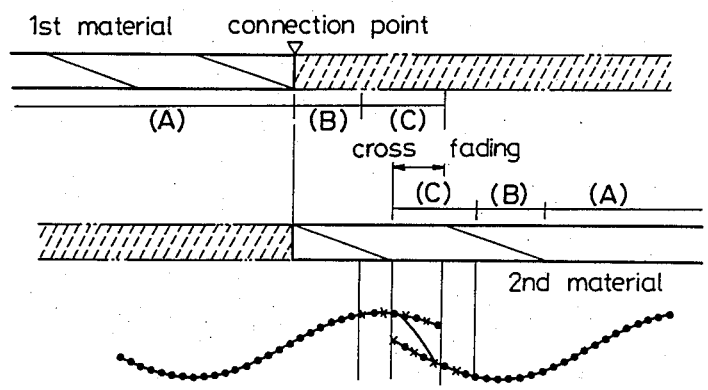
FIG. 11, (A)-(C), is a diagram showing the concept of the reproduced signal at a hand cut edition.

On the other hand, there may be a case where a hand cut edition is conducted by such PCM recording and reproducing apparatus. FIG. 11 shows the concept of this hand cut edition. Now suppose that two recording materials to which the recordings are conducted separately are connected with each other at a connecting point. As the signals are recorded separately into materials 1 and 2, when the reproduction is conducted from the left side, signals are reproduced in the order from the usual reproduction section A, the error correction section B, and the error correction section C in the material 1. To the contrary, the signal in the material 2 is reproduced in the order reverse to the above-mentioned one, that is, from the error correction section C, the error correction section B, and the usual reproduction section A. Herein, the error correction section B is a section where the original signal can be recovered by conducting an error correction by the $C_1$ and $C_2$ code, and the error correction section C is a section where an error can be interpolated one after another sample with the even number PCM data or the odd number PCM data being reproduced correctly regardless of the fact that the error correction can not be conducted. The signals of the materials 1 and 2 are reproduced in this way, and the signals of the error interpolating section C overlap with each other as shown in FIG. 11. By conducting a fade-out of the signal of the material 1 and a fade-in of the signal of the material 2, and adding both signals (hereinafter referred to as "cross-fading"), the reproduced signal at the hand cut edition point can be made smooth. The section in which this cross-fading can be conducted is determined in accordance with the data arrangement of FIG. 8, as there are twelve blocks between the last word $W_{10}$ of the even number PCM data and the first word $W_1$ of the odd number PCM data.

Next is a consideration with raising concrete values. If it is supposed that the sampling frequency $F_S$ is 48 kHz, then one frame is constituted by 10 pieces of 2 channel data, PCM data is arranged on 6 tracks, and the frequency of one block becomes $48/(10 \times 6) = 0.8$ KHz. Accordingly, the time period of the 12 block cross-fading section becomes $12/0.8$ KHz $= 15$ msec. Actually errors are generated at the neighborhood of the hand cut edition point, and this time period is further shortened. Furthermore, the above-described example is a case where the quantization bit number is 16, and the cross-fading time is also shortened in a case where the quantization bit number is 20.

In the conventional PCM recording and reproducing apparatus with such a construction, only 12 blocks can be used as the cross-fading section at the hand cut edition, and it cannot correspond to a case where a long cross-fading time is required.

A second embodiment of the present invention will be described.

Figure 12:
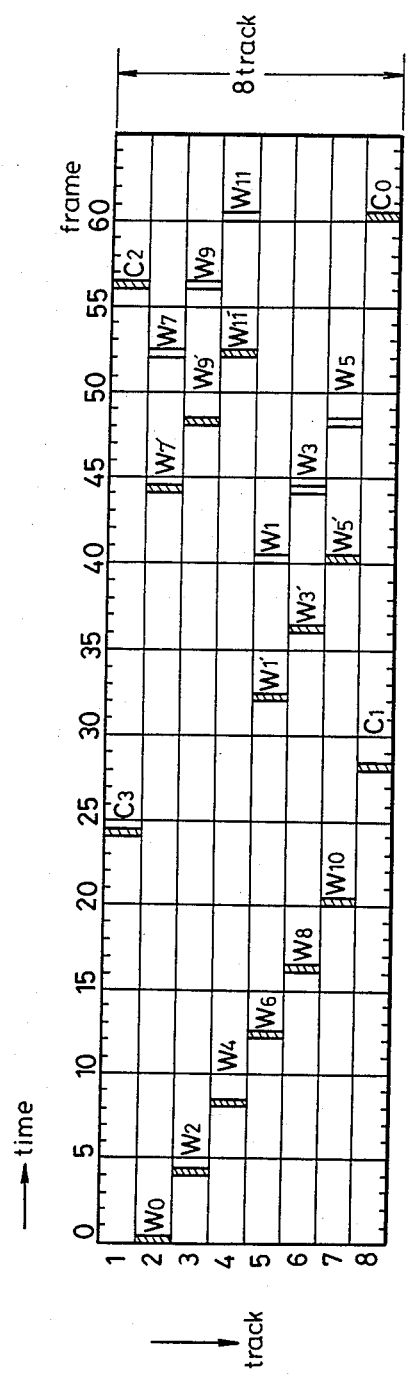
FIG. 12 is a diagram showing a data arrangement on the recording and reproducing material of a PCM recording and reproducing apparatus as a second embodiment of the present invention.

FIG. 12 shows an arrangement of the PCM data on a recording and reproducing medium in a second embodiment of the present invention. The A/D converted PCM data are generated in the order of $W_0, W_1, W_2, \ldots W_0, W_2, W_4, \ldots$ are even number PCM data, $W_1, W_3, W_5, \ldots$ are odd number PCM data, and $W_1', W_3', W_5', \ldots$ are delayed odd number PCM data. The reference characters $C_3, C_2, C_1, C_0$ designate inspection data of the $C_2$ code, and they are generated from the even number PCM data and the delayed odd number PCM data. The inspection data $C_3$ and $C_1$ are arranged subsequent to the even number PCM data and the inspection data $C_2$ and $C_0$ are arranged subsequent to the delayed odd number PCM data. Each PCM data is arranged apart from each other by 4 blocks.

The method of generating the data arrangement of FIG. 12 will be described with reference to FIG. 13 which shows the encoding and the data interleaving sequence of this second embodiment.

Among the A/D converted PCM data odd number PCM data $W_{12i+1}, W_{12i+3}, \ldots$ are delayed by $d_1$. Next, $C_2$ encoding is conducted from the even number PCM data and the delayed odd number PCM data, and $n=4$ words of $C_2$ inspection data are generated as $C_{4i+3}, C_{4i+2}, C_{4i+1}, C_{4i+0}$. Subsequently thereto, a delay $d_2$ is given to the delayed odd number PCM data and to the $(n-n_1) = 2$ words of $C_2$ inspection data $C_{4i+2}, C_{4i+0}$, and delays $d_3$ to $7d_3$ are given to the respective data as shown in FIG. 13. In this way a data arrangement shown in FIG. 12 is obtained. Herein, i of the $W_{12i+1}$ is an integer, and the pattern of data interleaving is repeated at every 12 data words. Suppose that one word comprises 2 channels of 16 bits, the $C_1$ inspection data is generated by the $C_1$ encoding for each track after the sequence of FIG. 13 is repeated $5 = 320/(2 \times 16 \times 2)$ times from the frame construction of FIG. 6 because the $W_{12i}$ and the $W_{12i+7}$ are arranged at the same track. The $d_1 = 40[T]$, $d_2 = 160[T]$, and $d_3 = 20[T]$, where the delay in one block is $5[T]$.

Figure 13:
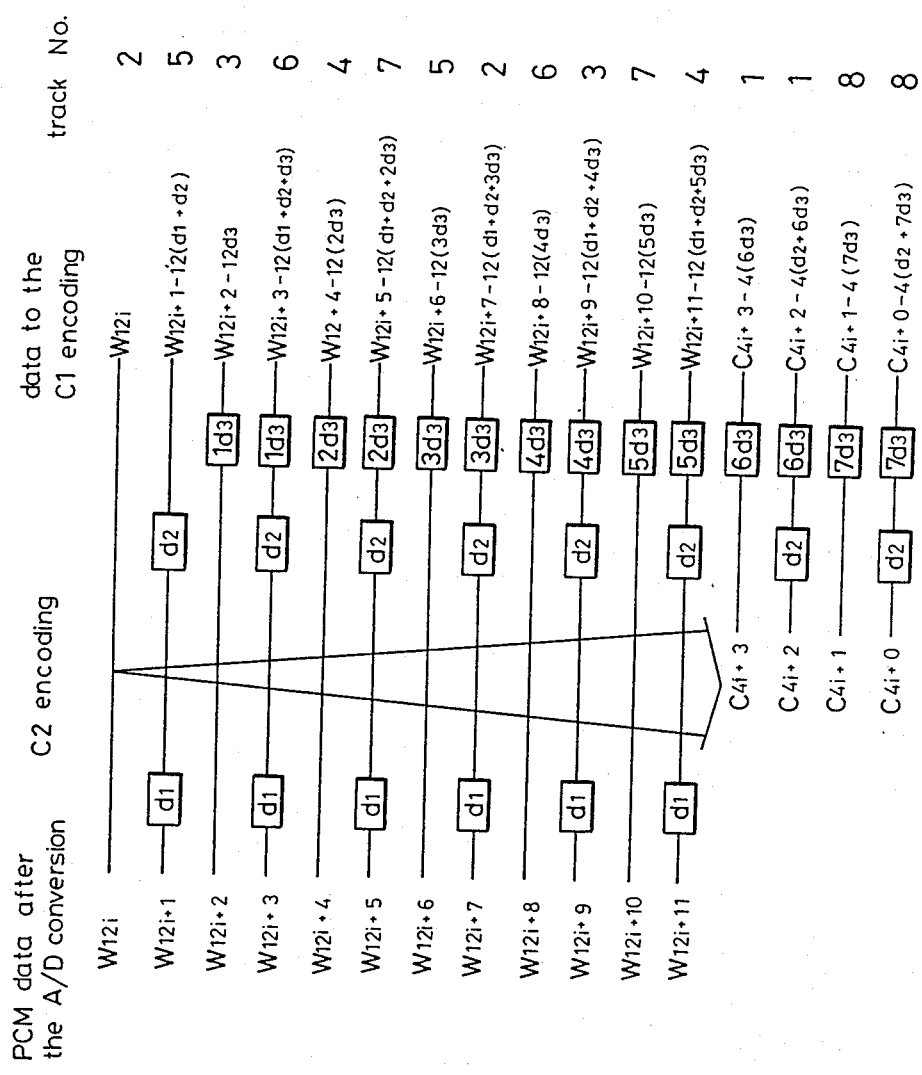
FIG. 13 is a diagram showing the concept of the encoding and data interleaving sequence of the second embodiment.

The encoder circuit for obtaining such a data arrangement is obtained by only changing the memory control circuit 66 of the encoder circuit 3 shown in FIG. 10 so that it complies with the delays of FIG. 13, and the memory capacity may be a capacity corresponding to 61 blocks similarly as the conventional device. Furthermore, the decoder circuit 34 can be easily obtained by constituting a sequence reverse to that shown in FIG. 13.

The PCM recording and reproducing apparatus of this second embodiment has the following properties. That is, the burst error correction ability amounts to 16 block errors in a case where errors are generated at each block because 4 errors can be corrected by $C_2$ code, for example, in a case where a Reed Solomon code on a Galois field ($2^8$) dealing with 8 bits as a unit (a symbol) is used as the $C_2$ correction code, similarly as the conventional device. Next, the cross-fade period at the connecting point in conducting a hand cut edition becomes 20 blocks between the last data $W_{10}$ of the even number PCM data and the first data $W_1$ of the odd number PCM data, showing an improvement. This is 25 msec when the Fs is 48 KHz, and this is 1.7 times as that of the conventional device.

As is evident from the foregoing description, according to the second embodiment, the $C_2$ inspection data are separately arranged at equal intervals subsequent to the even number PCM data and to the delayed odd number PCM data which constitutes a $C_2$ code together, and the odd number PCM data is spaced apart from the even number PCM data as much as possible, whereby an apparatus which has a constant memory capacity and is capable of obtaining the highest burst error correction ability and of increasing the cross-fade period of the hand cut edition is obtained.

In the above-illustrated second embodiment, the number of $C_2$ inspection data arranged subsequent to the even number PCM data and that arranged subsequent to the delayed odd number PCM data are made equal to each other, and $d_1$ is made equal to $(n-n_1) \times d_3$, but even in a case where $n_1 \neq n_2$ the same effects can be obtained. Furthermore, the biggest effects are obtained when $d_1 = (n-n_1) \times d_3$, but $d_1$ may not be equal to $n_2 \times d_2$.

By the way, as the $C_2$ error correction code a Reed Solomon code on a Galois field ($2^8$) dealing with 8 bits as a unit (a symbol) is used. The codes which are adopted in such as CD players or DAT (digital audio tape) decks are equivalent ones to this Reed Solomon code. When the number of bits of one symbol is increased the signal processing ability of the error correction encoder and decoder are enhanced, but to the contrary the size of the hardware is enlarged. When GF ($2^{10}$) is used instead of GF ($2^8$) the size of the hardware becomes about 4 times, and this is not practical. Accordingly, usually a code of 8 bits per symbol is used. However, code interleaving must be conducted at a word unit as described above, and the relationship between the word and the symbol should be considered in conducting the interleaving.

Figure 14:
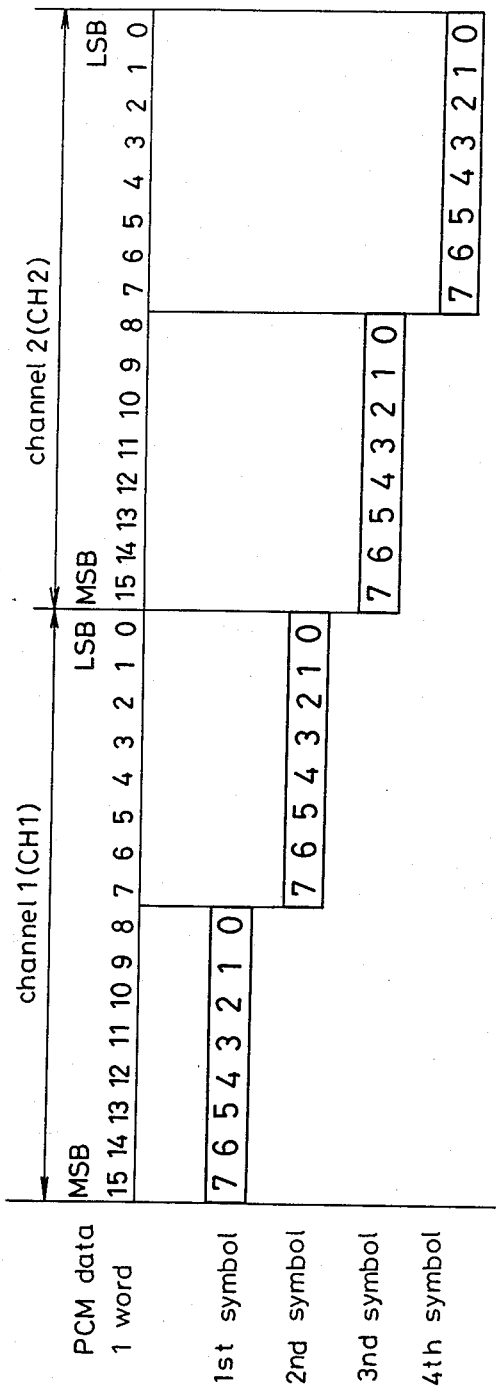
FIG. 14 is a diagram showing the concept of the frame and block construction in view of the relationship between the symbol and the word of a conventional device.

FIG. 14 shows a word construction. One word comprises a total of 32 bits including 16 bits of the channel 1 (CH 1) and 16 bits of the channel 2 (CH2). The 16 bits of each channel is divided into an upper 8 bits and a lower 8 bits, the upper 8 bits of the channel 1 (CH1) is made a first symbol, the lower 8 bits of the channel 1 (CH2) is made a second symbol, the upper 8 bits of the channel 2 is made a third symbol, and the lower 8 bits of the channel 2 is made a fourth symbol. Thus, one word comprises 4 symbols. The encoding is conducted to obtain $C_0, \ldots, C_3$ by generating an inspection word from the first symbol of each word of $W_0, W_1', W_2, W_3', \ldots, W_{11}'$. The similar encodings are also applied to the 2nd, 3rd, and 4th symbol. Herein, it is fundamental that data of one channel is represented by 2 symbols.

Figure 3:
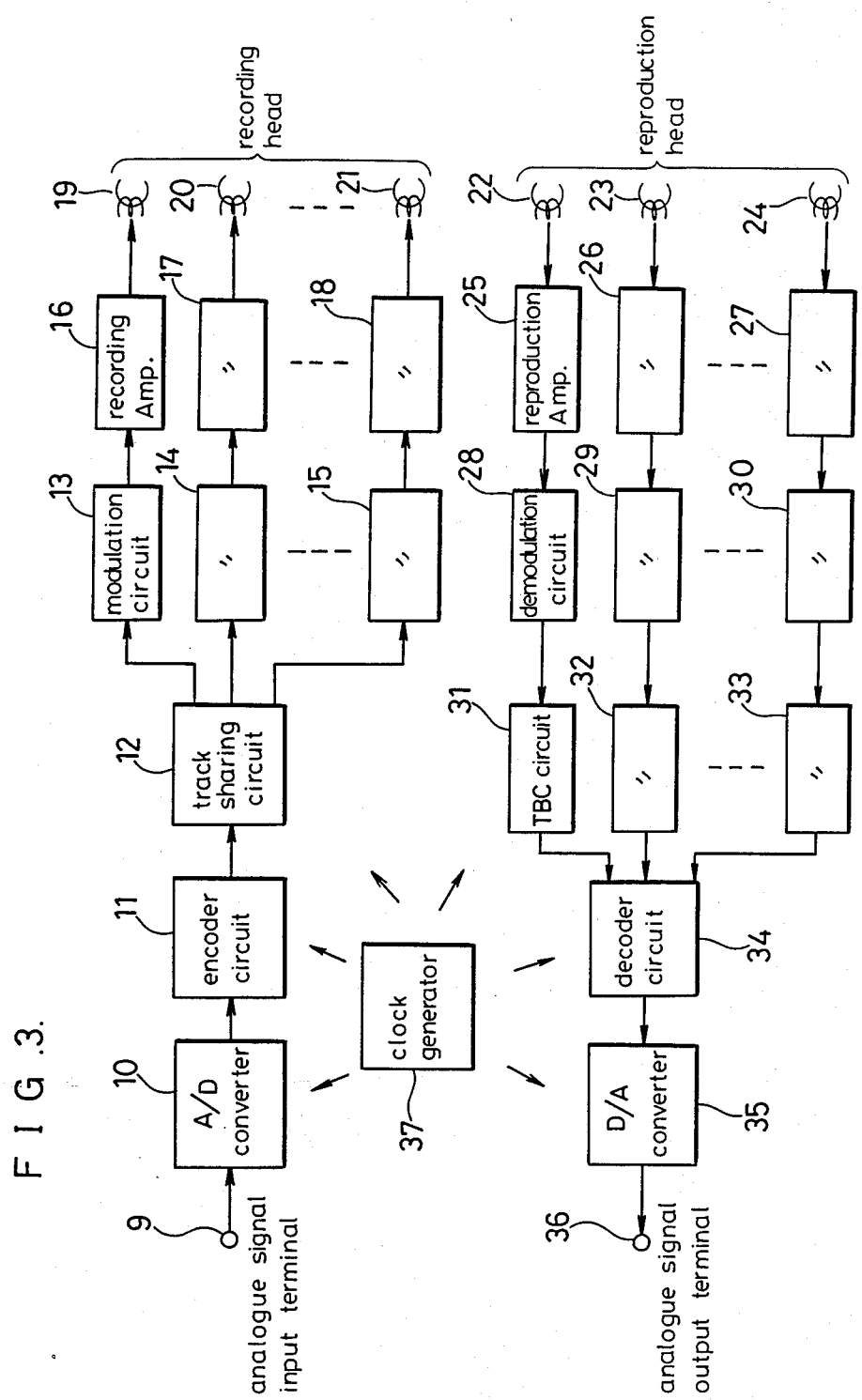
FIG. 3 is a block diagram showing a multi track PCM recording and reproducing apparatus.
Figure 5:
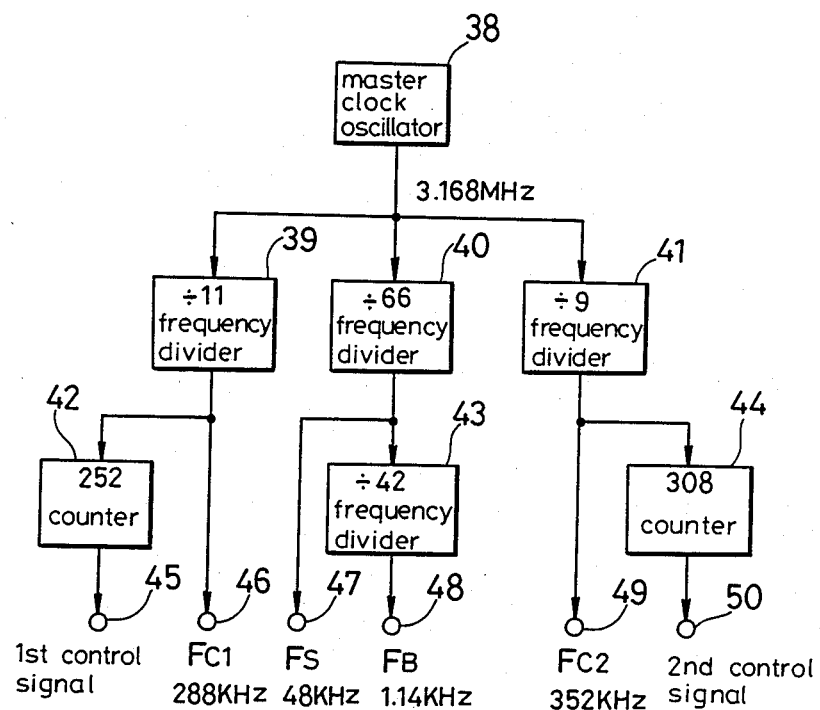
FIG. 5 is a block diagram showing a clock generator for realizing both of the frame/block constructions of FIG. 1 and FIG. 4.
Figure 15:
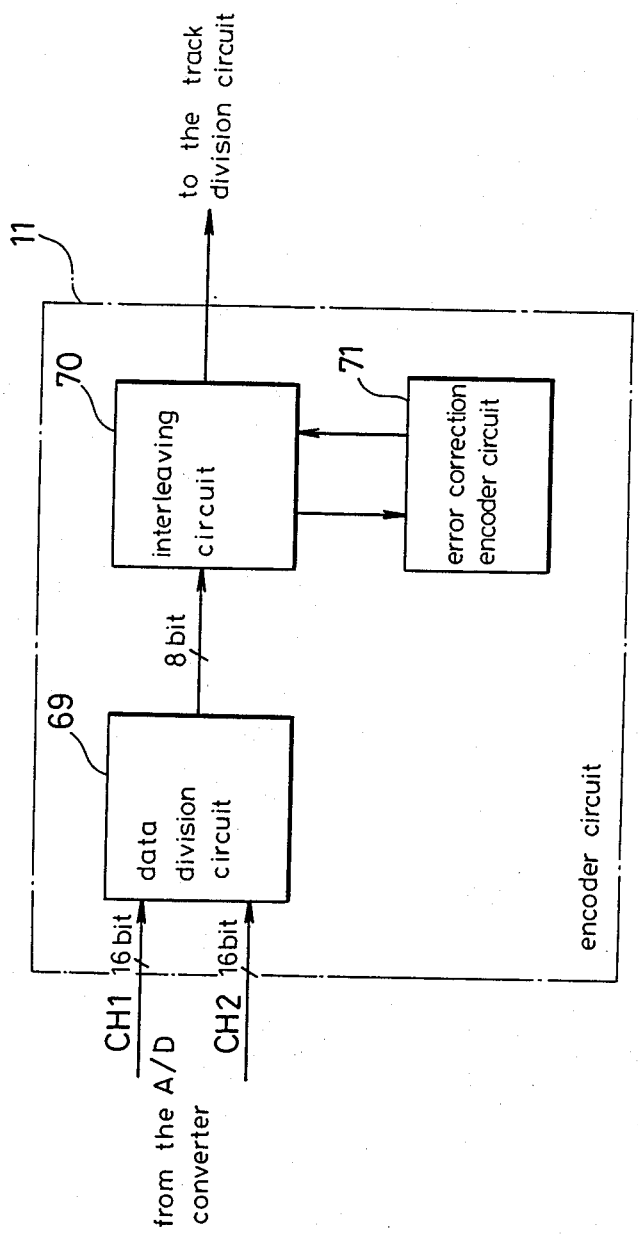
FIG. 15 is a diagram showing an encoder circuit equivalent to the circuit of FIG. 10.

The circuit of FIG. 10 which is an encoder circuit of a PCM recording and reproducing apparatus shown in FIG. 3 having such a frame construction can be represented as shown in the circuit of FIG. 15. In FIG. 15, the reference numeral 69 designates a data division circuit, the numeral 70 designates an interleaving circuit, and the numeral 71 designates an error correction encoder circuit. The data division circuit 69 has the function described with reference to FIG. 14, and the PCM data of 32 bits of the channel 1 and the channel 2 from the A/D converter 2 is made one word, and this is divided into 4 symbols to be transferred to the interleaving circuit 70. In the interleaving circuit 70 an interleaving described with reference to FIG. 13 is conducted, and the encoded data is sent to the track sharing circuit 12. The error correction encoder circuit 71 takes a predetermined data from the interleaving circuit 70 ($W_0, W_1', W_2, W_3', \ldots$ in FIG. 13) to conduct an encoding, and the generated inspection data are written into a predetermined position ($C_0, C_1, \ldots$ in FIG. 13).

Figure 16:
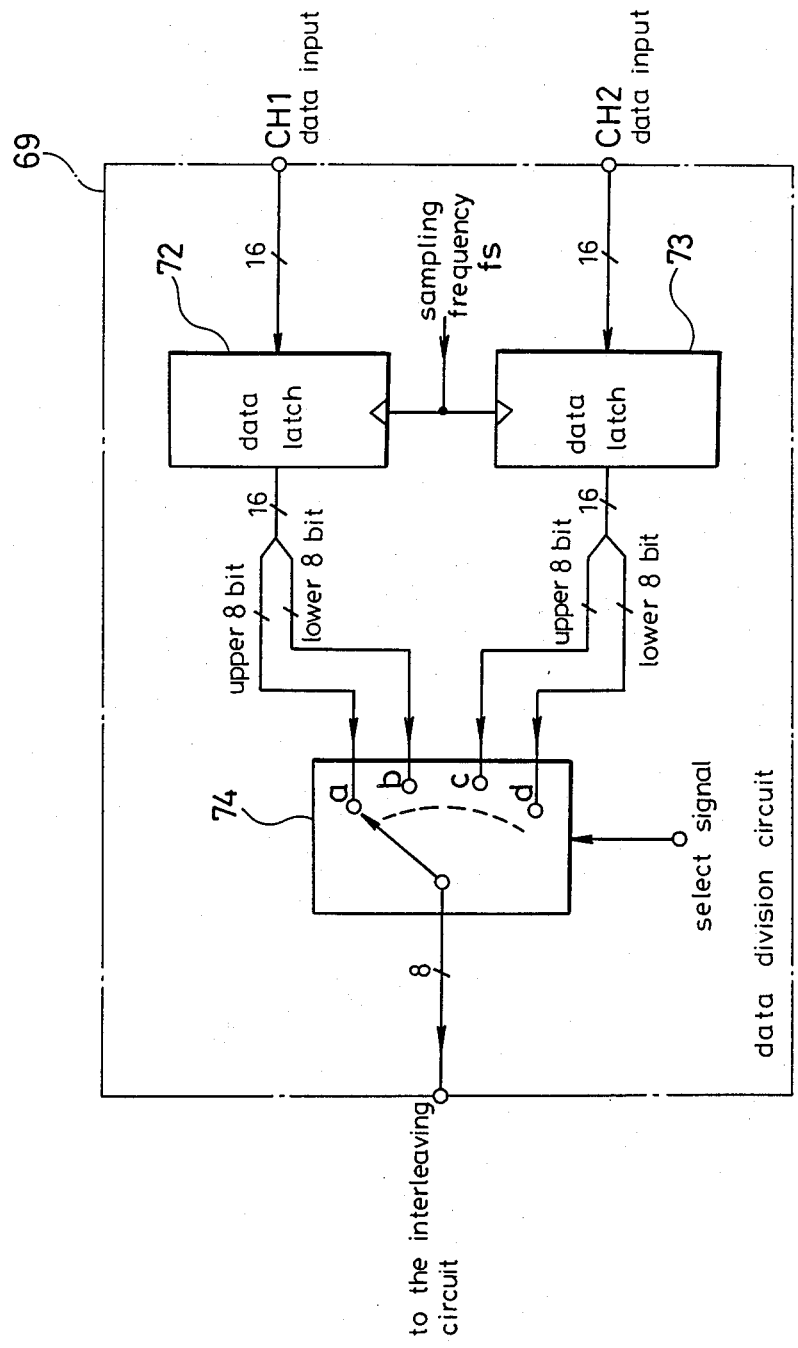
FIG. 16 is a circuit diagram showing a data division circuit which produces the relationship between the symbol and the word of FIG. 14 in a case where Q=16 bits.

The data division circuit 69 is realized by the circuit of FIG. 16. The reference numerals 72 and 73 designate a data latch circuit, and the reference numeral 74 designates a selector circuit. In the data latch circuits 72 and 73 two channel PCM data of 32 bits sent from the A/D converter 2 is taken in at each pulse of sampling frequency fs, and it is held until the next data is input thereto. The selector circuit 74 selects successively the upper 8 bits of the data latch 72, the lower 8 bits of the data latch 72, the upper 8 bits of the data latch 73, and the lower 8 bits of the data latch 73 to output a, b, c, d by the select signal, and they are sent to the interleaving circuit 70 at every 8 bits (a symbol).

Figure 17:
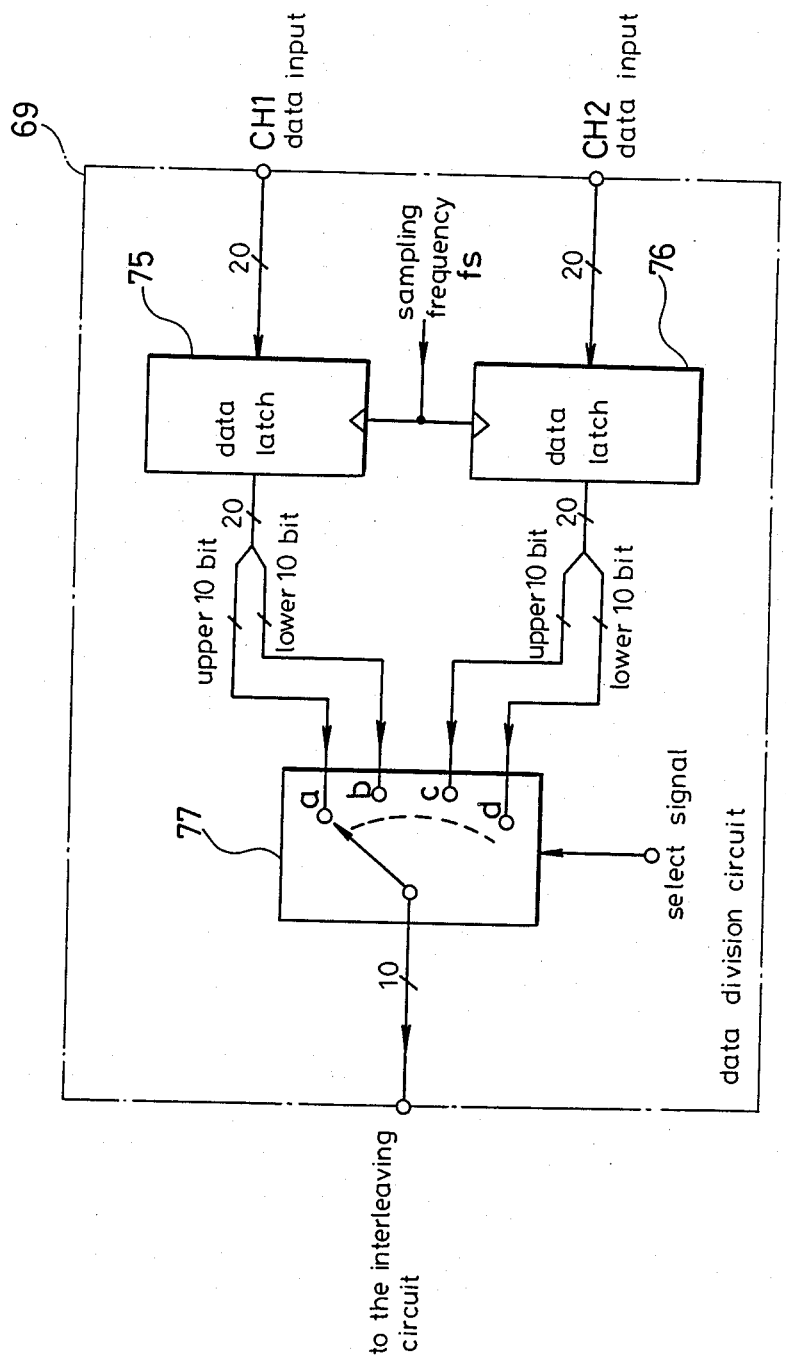
FIG. 17 is a circuit diagram showing a data division circuit corresponding to the circuit of FIG. 16 in a case where Q=20 bits.

The conventional PCM recording and reproducing apparatus is constructed in such a manner, and when the number of bits of the A/D converter is changed the bit number of one symbol of the data division circuit 69 need be changed similarly. For example, in a case of 2 channels and a quantization bit number of 20 bits the circuit becomes one shown in FIG. 17, and 1 symbol must comprise 10 bits. Herein, the reference numerals 75 and 76 designate data latches of 20 bits, and the reference numeral 77 designates a selector circuit of 10 bits.

However, as described above, an error correction circuit in a case where 1 symbol comprises 10 bits (an encoder of an error correction code on a GF ($2^{10}$)) becomes to have a large sized hardware, and this is not practical. Furthermore, although only the encoder is described above, the decoder also becomes have a large sized hardware because a procedure reverse to that of the encoding procedure must be conducted in the decoder.

As described above in the conventional device the 1 symbol bit number of the error correction encoder and decoder need be changed in accordance with the quantization bit number of the PCM data, thereby resulting in an increased circuit size. Furthermore, it cannot accommodate a case where the same error correction encoder and decoder are used and only the quantization bit number is changed.

The third embodiment of the present invention will be described in the following.

Figure 18:
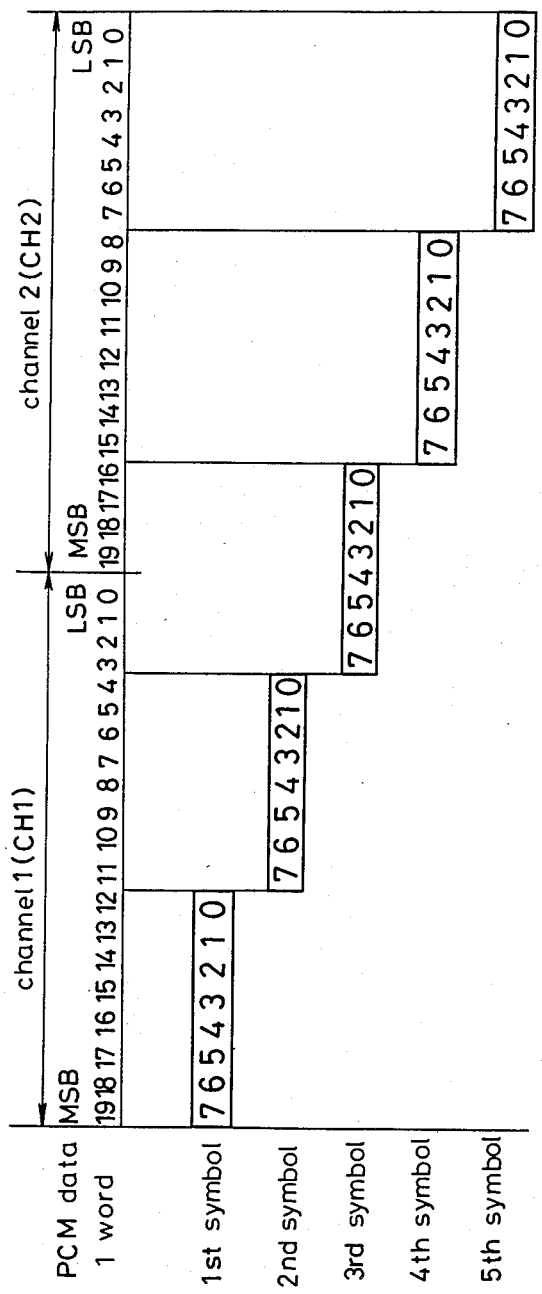
FIG. 18 is a diagram showing the concept of the relationship between the word and the symbol in a third embodiment of the present invention.

This embodiment is an example in a case where Q=20, N=2, and l=8 which satisfies the formula (1). FIG. 18 shows a word construction in a case where the quantization bit number is 20. 1 word comprises a total of 40 bits including 20 bits of the first channel CH1 and 20 bits of the second channel CH2. The 20 bits of the first channel CH1 is divided into an upper 8 bits, a middle 8 bits, and a lower 4 bits, and the 20 bits of the second channel CH2 is divided into an upper 4 bits, a middle 8 bits, and a lower 8 bits. The upper 8 bits of the first channel CH1 and the middle 8 bits of the first channel CH1 are made a first symbol and a second symbol, respectively, and the 8 bits comprising the lower 4 bits of the first channel CH1 and the upper 4 bits of the second channel CH2 is made a third symbol, the middle 8 bits and the lower 8 bits of the second channel CH2 are made a fourth symbol and a fifth symbol, respectively. Thus, one word comprises 5 symbols. The error correction encoding is conducted by $C_2$ encoding collecting 1 symbol from each word of the code interleaving similarly as the conventional device.

Figure 19:
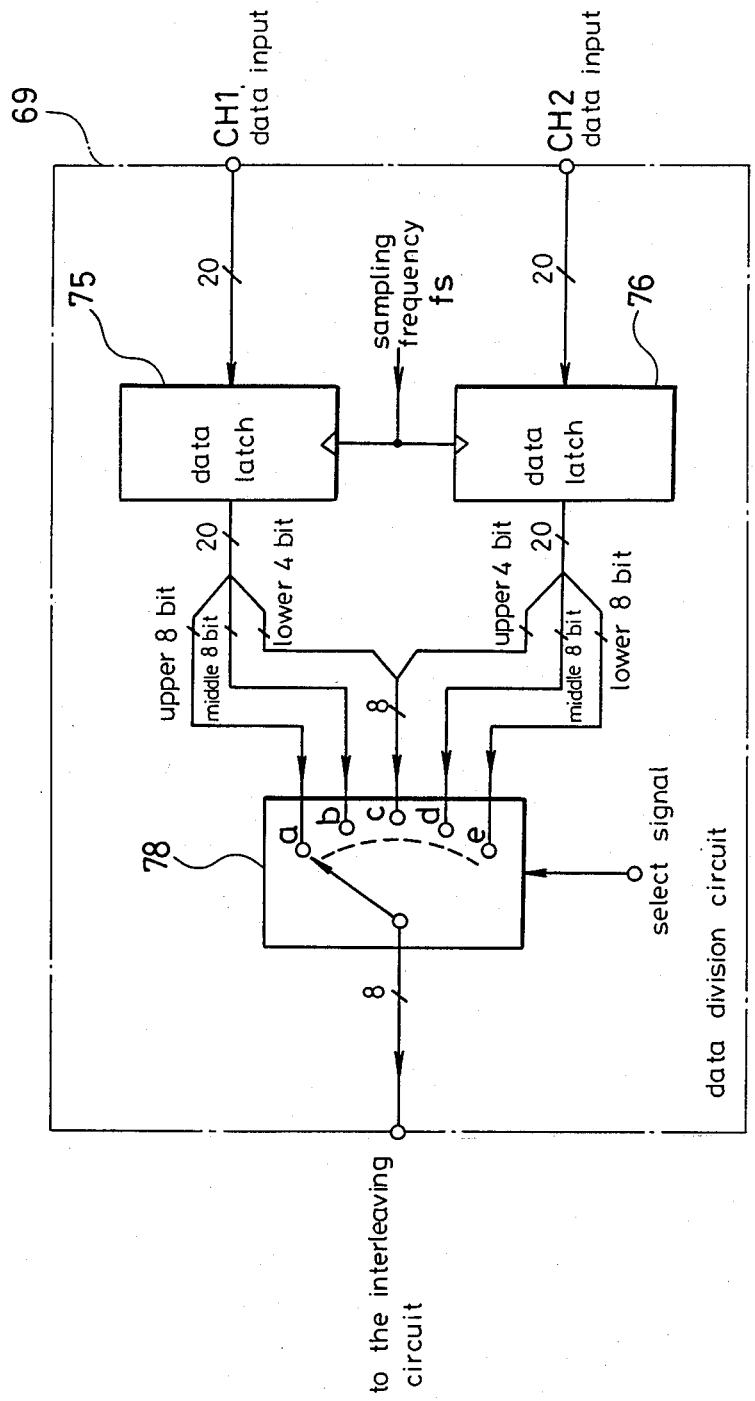
FIG. 19 is a circuit diagram showing a data division circuit of the third embodiment of the present invention.

The data division circuit 69 of this case is realized by the circuit of FIG. 19. In the data latch circuits 75 and 76 the two channels of PCM data 40 bits sent from the A/D converter 10 are taken in at each pulse of sampling frequency fs, and it is held until the next data is input thereto. The selector circuit 78 selects the upper 8 bits of the data latch 75, the middle 8 bits of the data latch 75, the lower 4 bits of the data latch 75 and the upper 4 bits of the data latch 76, the middle 8 bits of the data latch 76, and the lower 8 bits of the data latch 76 as a, b, c, d, and e by a select signal during a time period of 1/fs while the data latch holds the data, and sends the same to the interleaving circuit 70 at every 8 bits (1 symbol).

By conducting the division of the word symbol at a word unit and symbolizing the same over a plurality of channels as described above, it is possible to accommodate the quantization bit number 16 (FIG. 18, FIG. 15, and FIG. 16) and 20 by the same error correction encoder (l=8). Accordingly, in the device of this third embodiment, the same error correction encoder can be used corresponding to a case where the quantization bit number is changed, and thus the hardware is simplified.

Figure 20:
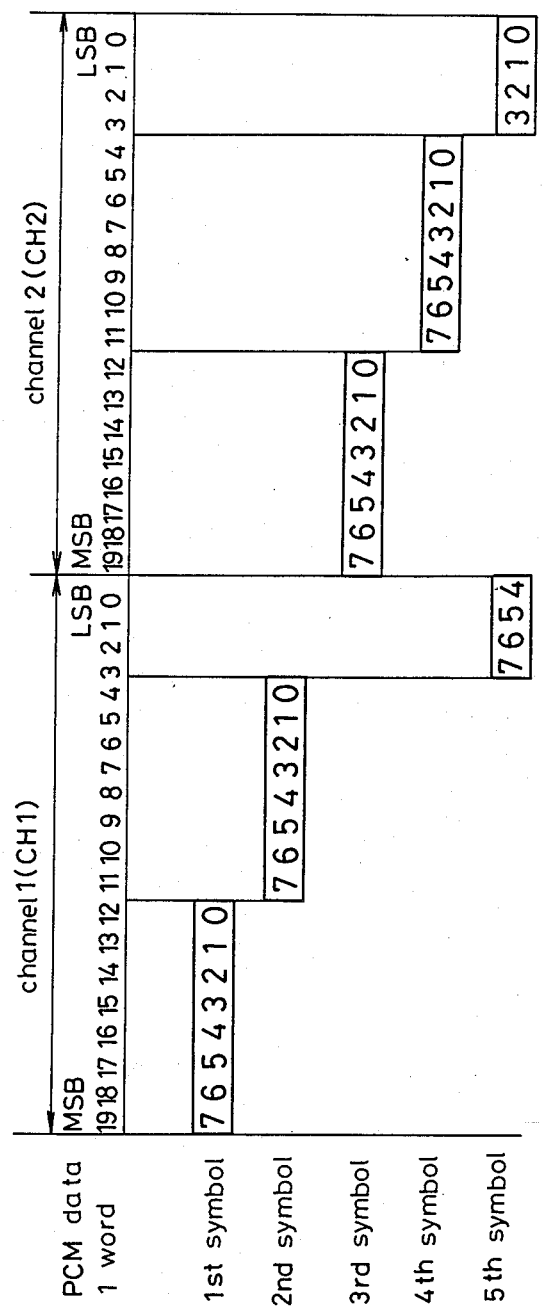
FIG. 20 is a diagram showing a concept illustrating the relationship between the word and the symbol in a fourth embodiment of the present invention.
Figure 21:
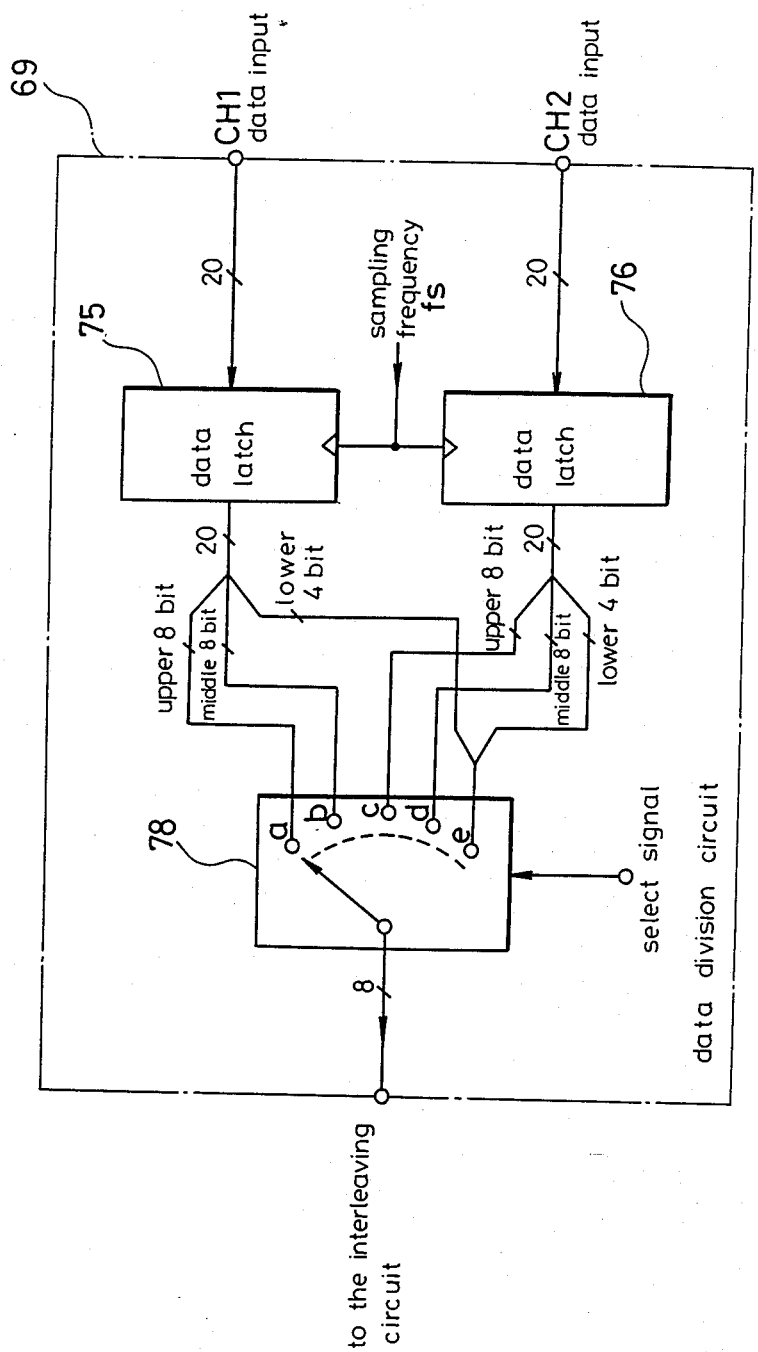
FIG. 21 is a circuit diagram showing a data division circuit of the fourth embodiment of the present invention.

A fourth embodiment of the present invention in a case where the quantization bit number Q=20 is shown in FIG. 20. In this fourth embodiment the upper 8 bits of the channel 1, the middle 8 bits of the channel 1, the upper 8 bits of the channel 2, the middle 8 bits of the channel 2, and the sum of the lower 4 bits of the channel 1 and the lower 4 bits of the channel 2 are made a first symbol, a second symbol, a third symbol, a fourth symbol, and a fifth symbol, respectively. The data division circuit 69 in this case can be realized by the circuit of FIG. 21. The circuit operation is the same as that of FIG. 17, and only the connection from the data latches 75 and 76 to the selector circuit 78 is different. The upper 8 bits of the data latch 75, the middle 8 bits of the data latch 75, the upper 8 bits of the data latch 76, the middle 8 bits of the data latch 76, and the sum of the lower 4 bits of the data latch 75 and the lower 4 bits of the data latch 76 are selected as a, b, c, d, and e by a select signal, respectively, and they are sent to the interleaving circuit 11 by 1 symbol. Also in this embodiment the same error correction encoder can be used corresponding to the quantization bit numbers 16 and 20.

As is evident from the foregoing description, according to the third and fourth embodiments, the word division is conducted at a word unit in conducting the error correction encoding, and the encoding is conducted by dividing 1 word into m for a quantization bit number Q which complies with $Q \times N/l = m$, whereby the same encoder and decoder can be used for different quantization bit numbers, thereby simplifying the hardware of the PCM recording and reproducing apparatus.

In the above-illustrated third and fourth embodiments the examples in which Q=16, 20, N=3, l=8 are described, but there of course exists various kinds of combinations of the quantization bit number, channel number, and 1 symbol bit number other than above on a condition that the formula (1) is complied with.

In the above-illustrated third and fourth embodiment only the encoder circuit is described, but also in the decoder circuit the same error correction decoder can be used corresponding to different quantization bit numbers similarly as above because a procedure reverse to the encoding procedure is conducted in the decoder circuit.

What is claimed is:

1. A pulse code modulation (PCM) recording and reproducing apparatus, comprising:
    means for sampling analog signals from N channels, N being an integer, at a predetermined sampling frequency;
    means for converting each sample into a digital signal of a specific number of bits Bi, Bi being a quantization bit number selectable from a plurality of quantization bit numbers Bi: i=1, ..., k; k being an integer;
    means for assembling frames of PCM data each comprising S samples;
    means for assembling blocks of PCM data each comprising Tr tracks, each track corresponding to one frame;
    means for setting the number of bits per frame to a value TA such that $TA = n \times LCM (Bi, i=1, ..., k) + m$ n: integer
    LCM(Bi, i=1, ..., k): least common multiple of all values Bi for i=1, ..., k m: an additional number of bits required for synchronization and control of said digital signals; and
    means for setting the number of samples per block to a value TB such that $TB = N \times S \times Tr$, wherein the ratio of TA to TB is a simple integer.

2. A PCM recording and reproducing apparatus as defined in claim 1, wherein k=2, B1=16, and B2=20.

3. A PCM recording and reproducing apparatus as defined in claim 1, wherein N=2, Tr=6, k=2, B1=16, B2=20, n=4, m=40, and the number of bits per frame TA is 360.

4. A PCM recording and reproducing apparatus as defined in claim 1, further including a single master clock oscillator for producing clock signals used by said means for sampling, means for converting, and means for assembling in the recording of digital signals of any of said plurality of quantization bit numbers.

5. A pulse code modulation (PCM) recording and reproducing apparatus, comprising:
    means for sampling analog signals at a predetermined frequency and converting said samples into digital signals of predetermined number of bits;
    means for dividing said digitized samples into even and odd numbered data;
    means for delaying said odd numbered data by a predetermined delay period;
    encoding means for generating error correction inspection data by encoding said even and delayed odd numbered data;
    data interleaving means for recording data on a plurality of tracks of a recording medium, including means for arranging said even numbered data, delayed odd numbered data and inspection data dividedly into separate tracks such that said even numbered data is recorded first, a first portion of said inspection data is recorded second, said delayed odd numbered data is recorded third and the remaining portion of said inspection data is recorded fourth,
    thereby enabling said recording medium to be edited with a relatively long period of cross-fade.

6. An encoder circuit for a pulse code modulation (PCM) recording and reproducing apparatus, comprising:
    means for encoding PCM data on N channels which is quantized into samples of Qi bits each, Qi being a variable quantization bit number selectable from at least two quantization bit numbers Qi, i=1, 2, on a Galois field (GF) of $(2^l)$, l being an integer constant; and
    a data division circuit for dividing a sequence of $Qi \times N$ bits of PCM data into $M_i$ symbols of l bits each, wherein $$M_i = \frac{Qi \times N}{l}$$

$M_i$ : integer said means for encoding conducting an encoding operation on each 1 bit symbol.

7. An encoder circuit as defined in claim 6, wherein Q1=20, N=2, l=8 and M1=5.

8. An encoder circuit as defined in claim 6, wherein Q2=16, N=2, l=8 and M2=4.

* * * * *